US011454737B1

(12) United States Patent
Lee et al.

(10) Patent No.: US 11,454,737 B1
(45) Date of Patent: Sep. 27, 2022

(54) PREDICTING THE FUTURE MAGNETIC ALIGNMENT OF A RUNWAY

(71) Applicant: United States of America as Represented by The Secretary of The Army, Alexandria, VA (US)

(72) Inventors: Theodore A Lee, Mobile, AL (US); Mihan McKenna, Vicksburg, MS (US)

(73) Assignee: UNITED STATES OF AMERICA AS REPRESENTED BY THE SECRETARY OF THE ARMY, Alexandria, VA (US)

(*) Notice: Subject to any disclaimer, the term of this patent is extended or adjusted under 35 U.S.C. 154(b) by 468 days.

(21) Appl. No.: 16/245,010

(22) Filed: Jan. 10, 2019

Related U.S. Application Data

(63) Continuation-in-part of application No. 16/147,877, filed on Oct. 1, 2018.

(51) Int. Cl.
| | |
|---|---|
| *G01V 3/38* | (2006.01) |
| *G01C 21/08* | (2006.01) |
| *G01V 3/40* | (2006.01) |
| *G08G 5/00* | (2006.01) |
| *G08G 5/02* | (2006.01) |
| *G05D 1/00* | (2006.01) |

(Continued)

(52) U.S. Cl.
CPC .............. *G01V 3/38* (2013.01); *G01C 21/08* (2013.01); *G01V 3/40* (2013.01); *G05D 1/00* (2013.01); *G08G 5/0017* (2013.01); *G08G 5/0026* (2013.01); *G08G 5/02* (2013.01); *G08G 5/025* (2013.01); *G01B 11/03* (2013.01); *G01C 21/30* (2013.01); *G06F 11/34* (2013.01); *G06F 11/3447* (2013.01); *G06Q 10/04* (2013.01)

(58) Field of Classification Search
CPC ............. G01V 3/38; G01V 3/40; G01C 21/08
See application file for complete search history.

(56) References Cited

U.S. PATENT DOCUMENTS

| | | | | |
|---|---|---|---|---|
| 7,963,618 B2* | 6/2011 | Stone | .................. | G08G 5/0021 |
| | | | | 301/16 |
| 10,606,271 B2* | 3/2020 | Tillotson | ................ | G05D 1/104 |

(Continued)

OTHER PUBLICATIONS

"Airport Runway Names Shift with Magnetic Field", https://www.ncei.noaa.gOv/news/airport-runway-names-shift-magnetic-field#, Nov. 20, 2017 (Year: 2017).*

(Continued)

*Primary Examiner* — Douglas Kay
(74) *Attorney, Agent, or Firm* — Brian C. Jones

(57) ABSTRACT

Disclosed is a method for predicting the future magnetic alignment of a runway. Extrapolating from previous historical records, the future trajectory of the Earth's eccentric geomagnetic axial pole ("ED") is predicted. With that predicted trajectory as the basis, the future azimuthal change between the location of the ED and the location of an airfield is calculated. At the location of the airfield, a future change in the declination between true north and geomagnetic north is then calculated based on the predicted azimuthal change. The predicted change in declination then becomes the predicted change in magnetic alignment of any runway at the airfield. By predicting future changes in the magnetic alignment of a runway, preparations for changing the name of the runway can be made.

10 Claims, 18 Drawing Sheets

(51) Int. Cl.
*G01C 21/30* (2006.01)
*G01B 11/03* (2006.01)
*G06F 11/34* (2006.01)
*G06Q 10/04* (2012.01)

(56) References Cited

U.S. PATENT DOCUMENTS

| | | | | |
|---|---|---|---|---|
| 10,677,916 | B2* | 6/2020 | Laplace | G01S 19/49 |
| 2008/0109163 | A1* | 5/2008 | Stone | G08G 5/025 |
| | | | | 301/16 |
| 2013/0168960 | A1* | 7/2013 | Kalinka | H02P 9/006 |
| | | | | 290/7 |
| 2017/0115752 | A1* | 4/2017 | Matsuno | G01C 22/006 |
| 2018/0024237 | A1* | 1/2018 | Laplace | G01S 19/49 |
| | | | | 701/16 |
| 2019/0018417 | A1* | 1/2019 | Tillotson | G05D 1/104 |

OTHER PUBLICATIONS

K. M. Laundal and A. D. Richmond, "Magnetic Coordinate Systems", Space Sci Rev DOI 10.1007/s11214-016-0275-y, Jul. 19, 2016 (Year: 2016).*

* cited by examiner

| Year | Lon.(W) | Year | Lon.(W) |
|---|---|---|---|
| 1940 | 68.5 | 2000 | 71.6 |
| 1945 | 68.5 | 2005 | 71.8 |
| 1950 | 68.8 | 2010 | 72.2 |
| 1955 | 69.2 | 2011 | 72.3 |
| 1960 | 69.5 | 2012 | 72.4 |
| 1965 | 69.9 | 2013 | 72.5 |
| 1970 | 70.2 | 2014 | 72.5 |
| 1975 | 70.5 | 2015 | 72.6 |
| 1980 | 70.8 | 2016 | 72.7 |
| 1985 | 70.9 | 2017 | 72.8 |
| 1990 | 71.1 | 2018 | 73 |
| 1995 | 71.4 | | |

FIG. 2

| Year | Lon. | Year | Lon. | Year | Lon. |
|---|---|---|---|---|---|
| 1940 | 260.12 | 1954 | 258.7 | 1968 | 258.88 |
| 1941 | 260.06 | 1955 | 258.58 | 1969 | 258.95 |
| 1942 | 259.99 | 1956 | 258.65 | 1970 | 259.02 |
| 1943 | 259.91 | 1957 | 258.73 | 1971 | 259.09 |
| 1944 | 259.84 | 1958 | 258.81 | 1972 | 259.15 |
| 1945 | 259.76 | 1959 | 258.88 | 1973 | 259.22 |
| 1946 | 259.64 | 1960 | 258.96 | 1974 | 259.29 |
| 1947 | 259.52 | 1961 | 258.9 | 1975 | 259.36 |
| 1948 | 259.39 | 1962 | 258.84 | 1976 | 259.15 |
| 1949 | 259.27 | 1963 | 258.78 | 1977 | 258.95 |
| 1950 | 259.141 | 1964 | 258.72 | 1978 | 258.74 |
| 1951 | 259.03 | 1965 | 258.66 | 1979 | 258.53 |
| 1952 | 258.93 | 1966 | 258.73 | 1980 | 258.32 |
| 1953 | 258.821 | 1967 | 258.8 | 1981 | 258.14 |
| Year | Lon. | Year | Lon. | Year | Lon. |
| 1982 | 257.95 | 1996 | 253.99 | 2010 | 227.16 |
| 1983 | 257.76 | 1997 | 253.21 | 2011 | 222.59 |
| 1984 | 257.58 | 1998 | 252.35 | 2012 | 217.52 |
| 1985 | 257.39 | 1999 | 251.4 | 2013 | 211.98 |
| 1986 | 257.18 | 2000 | 250.36 | 2014 | 206.05 |
| 1987 | 256.97 | 2001 | 248.99 | 2015 | 199.97 |
| 1988 | 256.75 | 2002 | 247.46 | 2016 | 193.71 |
| 1989 | 256.53 | 2003 | 245.7 | 2017 | 187.41 |
| 1990 | 256.31 | 2004 | 243.88 | 2018 | 181.24 |
| 1991 | 256.01 | 2005 | 241.78 | | |
| 1992 | 255.69 | 2006 | 239.4 | | |
| 1993 | 255.38 | 2007 | 236.78 | | |
| 1994 | 255.05 | 2008 | 233.9 | | |
| 1995 | 254.71 | 2009 | 230.75 | | |

FIG. 3

| ED Pole | North | | South | |
|---|---|---|---|---|
| Model | Lat. | Lon. | Lat. | Lon. |
| DGRF 1945 | 80.9 | -83.9 | -75.52 | 121.1 |
| DGRF 1950 | 81.04 | -84.4 | -75.38 | 120.7 |
| DGRF 1955 | 81.15 | -84.9 | -75.25 | 120.3 |
| DGRF 1960 | 81.3 | -85.6 | -75.19 | 120 |
| DGRF 1965 | 81.4 | -86.3 | -75.13 | 119.6 |
| DGRF 1970 | 81.53 | -87.1 | -75.1 | 119.4 |
| DGRF 1975 | 81.68 | -88 | -75.91 | 119.3 |
| DGRF 1980 | 81.77 | -88.9 | -74.71 | 118.9 |
| DGRF 1985 | 82.04 | -89.9 | -74.78 | 118.9 |
| DGRF 1990 | 82.31 | -91 | -74.82 | 118.7 |
| IGRF 1995 | 82.6 | -92.2 | -74.9 | 118.5 |
| IGRF 2000 | 82.96 | -93.1 | -74.99 | 118.4 |
| IGRF 2005 | 83.29 | -94.1 | -75.07 | 118 |
| IGRF 2010 | 83.67 | -95.7 | -75.24 | 117.6 |
| IGRF 2015 | 84.09 | -97.6 | -75.41 | 117.3 |

FIG. 6

| ED Pole Model | Distance / azimuth | |
|---|---|---|
| DGRF 1945 | | 18km / 325.55° |
| DGRF 1950 | 15km / 324.64° | |
| DGRF 1955 | | 20km / 326.06° |
| DGRF 1960 | 16km / 313.86° | |
| DGRF 1965 | | 20km / 318.34° |
| DGRF 1970 | 22km / 318.31° | |
| DGRF 1975 | | 18km / 323.37° |
| DGRF 1980 | 34km / 333.31° | |
| DGRF 1985 | | 33km / 331.17° |
| DGRF 1990 | 37km / 334.04° | |
| IGRF 1995 | | 42km / 340.16° |
| IGRF 2000 | 39km / 340.07° | |
| IGRF 2005 | | 47km / 334.355° |
| IGRF 2010 | 52km / 334.89° | |
| IGRF 2015 | | |
| Prediction 2020 | 54 km / 333.92° | Forecasted location 64.519, -99.856 |

FIG. 11

| Tampa Intl. | Az. To ED | Az. Diff | ΔDec./yr | Total diff |
|---|---|---|---|---|
| 1980 | 358.87° | 0.12° | 0.14° | 0.02° |
| 1985 | 358.75° | | | |
| 1985 | 358.75° | 0.12° | 0.13° | 0.01° |
| 1990 | 358.62° | | | |
| 1990 | 358.62° | 0.13° | 0.14° | 0.01° |
| 1995 | 358.49° | | | |
| 1995 | 358.49° | 0.07° | 0.12° | 0.05° |
| 2000 | 358.42° | | | |
| 2000 | 358.42° | 0.05° | 0.10° | 0.05° |
| 2005 | 358.37° | | | |
| 2005 | 358.37° | 0.11° | 0.10° | 0.01° |
| 2010 | 358.26° | | | |
| 2010 | 358.26° | 0.10° | 0.10° | 0.0° |
| 2015 | 358.16° | | | |
| 2015 | 358.16° | 0.11° | 0.10° | 0.01° |
| 2020 | 358.05° | | | |
| Prediction | 358.05° | 0.10° | 0.10° | 0.0° |

FIG. 12

PREDICTING THE FUTURE MAGNETIC ALIGNMENT OF A RUNWAY

FEDERALLY SPONSORED RESEARCH OR DEVELOPMENT

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present disclosure is related generally to aerial navigation and, more particularly, to aerial navigation by means of the Earth's magnetic field.

Description of the Related Art

This section introduces aspects that may help facilitate a better understanding of the invention. Accordingly, the statements of this section are to be read in this light and are not to be understood as admissions about what is prior art or what is not prior art.

When navigating, determining directional headings by means of magnetic orientation has been the most widely used method throughout much of recorded history. More specifically, an airport runway is named according to the magnetic alignment of the prevailing runway centerline as viewed from the approach end. When, due to migration of the Earth's magnetic poles, the actual magnetic alignment of the runway's centerline begins to differ significantly from the runway's name, the runway's name must be changed to bring it back into agreement with the local magnetic variation.

BRIEF SUMMARY

Extrapolating from previous historical records, the future trajectory of the Earth's eccentric geomagnetic axial pole is predicted. With that predicted trajectory as the basis, the future azimuthal change between the location of the Earth's eccentric geomagnetic axial pole and the location of an airfield is calculated. At the location of the airfield, a future change in the declination between true north and geomagnetic north is then calculated based on the predicted azimuthal change. The predicted change in declination then becomes the predicted change in magnetic alignment of any runway at the airfield. By predicting future changes in the magnetic alignment of a runway, preparations for changing the name of the runway can be made.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 2 is a table showing how the longitude of the geomagnetic dipole has migrated from 1940 to 2018;

FIG. 3 is a table showing how the northern magnetic dipole has migrated from 1940 to 2018;

FIG. 6 is a table of the positions of the ED axial poles from 1945 to 2015;

FIG. 11 is a table of the migration distances and azimuthal directions of the migrating ED axial poles as calculated for 1945 to 2015 and as predicted for 2020; and FIG. 12 is a table of the magnetic declination changes at Tampa International Airport from 1980 to 2015 and then as predicted for 2020.

DETAILED DESCRIPTION

Figure 1:
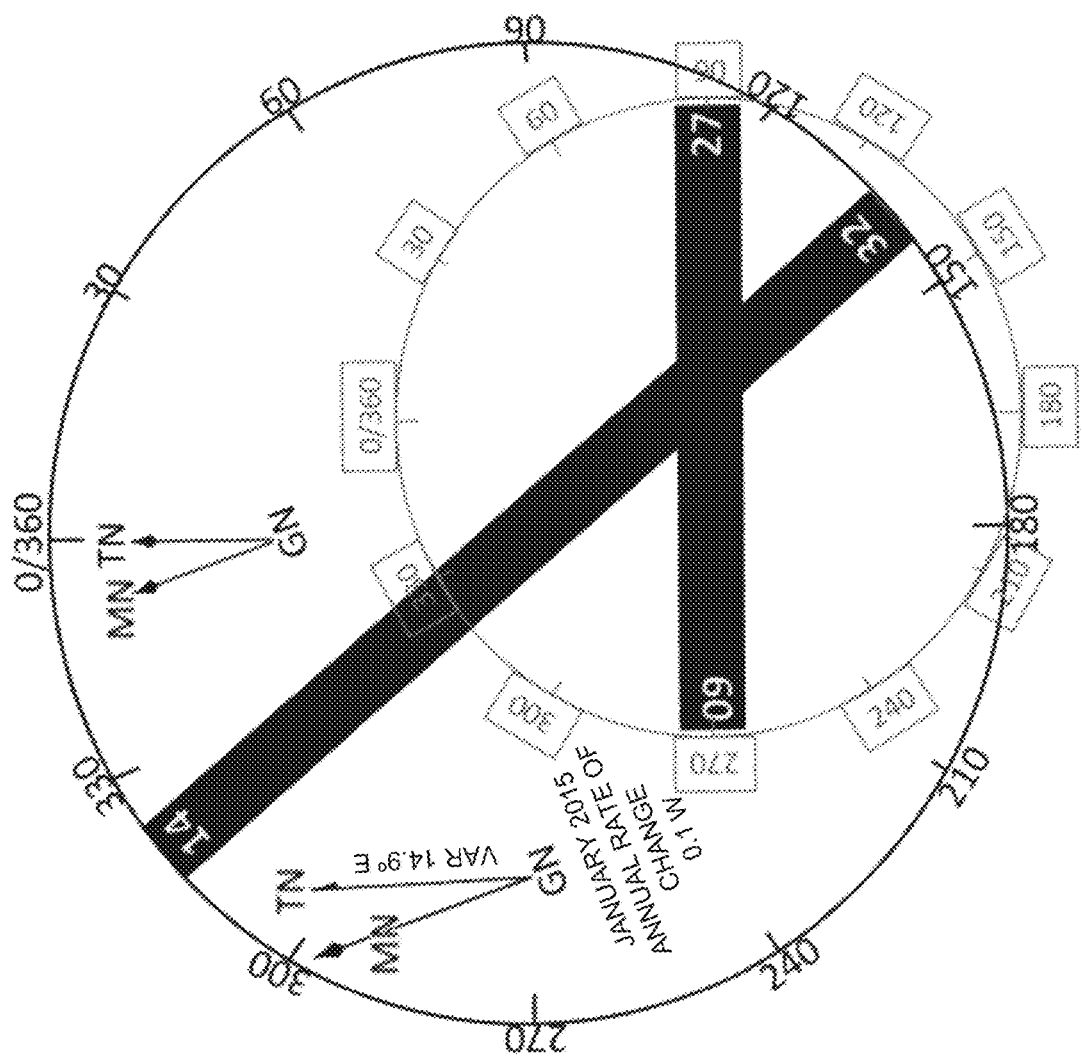
FIG. 1 is a schematic showing how magnetic alignment is used to name runways.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the" are intended to include the plural forms as well, unless the context clearly indicates otherwise. It further will be understood that the terms "comprises," "comprising," "includes," and "including" specify the presence of stated features, steps, or components but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The Earth's magnetic field has weakened in recent years, correlating with increased migration rates of the magnetic poles. The net direction of magnetic migration appears to be tied to the Earth's rotational axis as measured by plate boundary observations. Global changes in magnetic declination suggest the possibility of a dipolar-driven extrinsic geomagnetic fulcrum situated in the South Atlantic, called the South Atlantic Anomaly ("SAA").

Such a discovery would be crucially important for future navigation systems. Identification of an SAA axial component and associated rates of movement of the continental plates would facilitate the prediction of how often, and in which orientation, airport runway modifications are needed. Recently, northern hemisphere runways to the east of the SAA have shifted westward (magnetically rotating counter-clockwise), and runways to the west of the SAA have shifted eastward (magnetically rotating clockwise).

In this era of magnetic secular acceleration, airfield runway names are at a higher risk of inaccuracy, which can increase the risk of runway incursions. The methods currently employed to calculate the World Magnetic Model ("WMM") are exhaustive, require years of coordination, and are excessively fine-grained for determining anticipated changes to runway magnetic alignments ("MAs"). By employing a novel use of the eccentric geomagnetic axial pole ("ED") and projecting future positions, techniques of the present disclosure can easily calculate anticipated changes to airfield runway MAs between WMM epochs and may even extend current forecasts that are made using the WMM.

When navigating, determining directional headings by means of magnetic orientation has been the most widely used method throughout recent history. Although Earth's magnetic field remains in constant flux, small or abrupt changes over relatively short periods can affect all means of navigation. Spherical harmonic models are used to calculate and represent Earth's large-scale magnetic field for orientation, navigation, and heading references, but to maintain accuracy thresholds over longer periods of time, these models rely on either slow-moving, secular changes within Earth's magnetic field or meandering magnetic flux that maintains position within a reasonably tolerable neighborhood.

Essentially, magnetic models calculate an up-to-date mean of unpredictable secular changes in Earth's viscous outer core flow to supply navigators the computational means to angularly transition between bearings of true north and geomagnetic north.

FIG. 1 illustrates how airport runways are named according to the magnetic alignment of the prevailing runway centerline ("PRC") as viewed from the approach end. In FIG. 1, the declination diagrams indicate the hypothetical angle differences between Ture North ("TN"), Magnetic North ("MN"), and Grid North ("GN") for a hypothetical 14-32, 09-27 dual runway. (The Federal Aviation Administration requires that prevailing runways must satisfy 95% (wind) coverage from yearly wind conditions within a local area, and if a single runway does not meet this requirement, a secondary runway is built to satisfy the 95% coverage requirement.) If a PRC MA is 3-digits, the degrees are rounded to the nearest ten degrees, and only the first two digits are used for the runway name, i.e., for a runway with MA of 180 degrees, the PRC approach end is named "18," and the opposite end is "36" (for a 360-degree MA). For a PRC with a 2-digit magnetic variation, the degrees are rounded to the nearest ten degrees, and only the first number is used, i.e., for PRC with a 45-degree magnetic variation, the runway is named "5" for 50 degrees.

When the magnetic variation at the location of a runway differs by 6 degrees or more from the runway's MA, the runway's name must be changed. Ideally, runway name changes are planned well in advance to provide adequate time to update maps, pilot manuals, and flight software, where runway signage is usually the last to be modified.

Because most runways are located in the northern hemisphere, and most of those are south of the geomagnetic dipole ("GeoMagNP"), longitudinal changes in GeoMagNP and the northern magnetic dip-pole ("MagNP") are the most influential for forcing changed runway MAs. Since 1899, MagNP and GeoMagNP have generally migrated north. For over 30 years (1940 through 1975), MagNP had a longitudinal variation of only 2 degrees, making changes to magnetic declination and changes to runway names scarce. However, FIG. 3 shows that the MagNP has migrated about 78 degrees west since 1976. FIG. 2 shows that the GeoMagNP has been more hysteretic, with longitudinal stability from 1940 through 1975 but with increasing variation since 2000.

Migrating pole vectors are the primary secular variation ("SV") constituent responsible for PRC MA realignment. The significance of accelerated geomagnetic SV to all forms of accurate, long-range navigation cannot be understated, and because civil airborne and seaborne vessels are not limited to navigation within the Continental United States ("CONUS"), the breadth of the individual missions of the Federal Aviation Administration, the National Geospatial Intelligence Agency, and the National Oceanic and Atmospheric Administration ("NOAA") are global. The present discussion focuses specifically on the WMM and how it relates to airfield PRC MA.

The current model used by the U.S. Department of Defense, the North Atlantic Treaty Organization, the Federal Aviation Administration, the National Geospatial Intelligence Agency, the United Kingdom's Defence Geographic Centre, the British Geological Survey, and other agencies is the WMM. Because the geomagnetic field is the result of many contributing phenomena at varying scales in both space and time, spherical harmonic expansions are used to adequately describe its morphological development over time. The coefficients in these expansions are then compared with the observed SV and used to estimate anticipated field variations. The WMM comprises two sets of Gauss coefficients to degree and order n=12. See Chulliat et al., "The US/UK World Magnetic Model for 2015-2020: Technical Report," Edinburgh, U K, and Boulder, Colo.: National Geophysical Data Center, NOAA. doi: 7289/V5TB14V7 (2015), the teachings of which are incorporated herein by reference in their entirety.

The first set is a spherical harmonic model that serves as the main magnetic field epoch base and is set at the beginning of each WMM release date, e.g., before Jan. 1, 2005, 2010, 2015, etc. Eighteen months prior to a new model release date, coefficients using ten different instantaneous measurements (recorded in 0.1 year intervals) are averaged and then used as the base rate of the anticipated SV. This averaged rate represents the predicted secular acceleration to be applied to the first set of coefficients (the epoch base). These combined data are intended to calculate global changes in magnetic declination over the lifetime of the new model.

When officially released on Jan. 1, 2015, the current model, VVMM2015, was meant to ensure accurate performance thresholds, called Grid Variation ("GV") error, or grivation, until the model's expiration date on Dec. 31, 2019. Essentially, GV error is an auxiliary angle for the direction of the geomagnetic field vector, which can be thought of as magnetic declination errors within the Polar Regions (≥/≤±55 degrees latitude) and is considered to be the angular equivalent to declination errors at lower latitudes. More specifically, grivation is dependent upon a map's projection and can be described as the ±east or ±west angular variation between an observer using grid north on a map and geomagnetic north with respect to the convergence of meridians at true north. GV is defined as:

$GV = D - \Lambda$ (for $\varphi > +55$ degrees latitude)

$GV = D + \Lambda$ (for $\varphi < -55$ degrees latitude)   Equation (1)

where:
φ=latitude
Λ=longitude
D=magnetic declination (For φ in the non-polar regions between −55 degrees latitude and +55 degrees latitude, use magnetic declination.) Geodetic latitude, φ, changes with respect to an observer's longitude, Λ. The angle of magnetic north, D, marks the declination quantity and direction of the geomagnetic field vector horizontally to the observer (where the magnetic horizontal intensity on Earth's surface is from 0 to 42,000 nT).

Because SV is an expression of varying vector quantities at differing scales over space and time, scalar expression of the phenomena is currently constrained and drives the limits of fine-grained forecasts over longer periods of time. Even the current WMM is limited by having only eleven individual global measurements, ten of which are averaged. Together these two sets of coefficients are used to estimate future changes in magnetic declination over 5-year periods. By expanding coefficients to the n=12 order and degree, the estimates made by this method are the best currently available and are fine for most applications. Despite this, recently observed trends continue to show accelerated rates of magnetic migration and a steady weakening of the main field, particularly since the release of VVMM2015. In February of 2018, NOAA's center for geomagnetism announced that VVMM2015 had exceeded its accuracy thresholds goal of 1 degree root mean square ("RMS") nearly two years before a planned update. Because these trends have continued to persist (at least since the year 2000), without a novel breakthrough in understanding of how the main field develops, or a fundamental adjustment in the methods currently used to forecast those changes, fine-grained accuracy thresholds over 5-year periods may be too ambitious for the immediate future.

Figure 4:
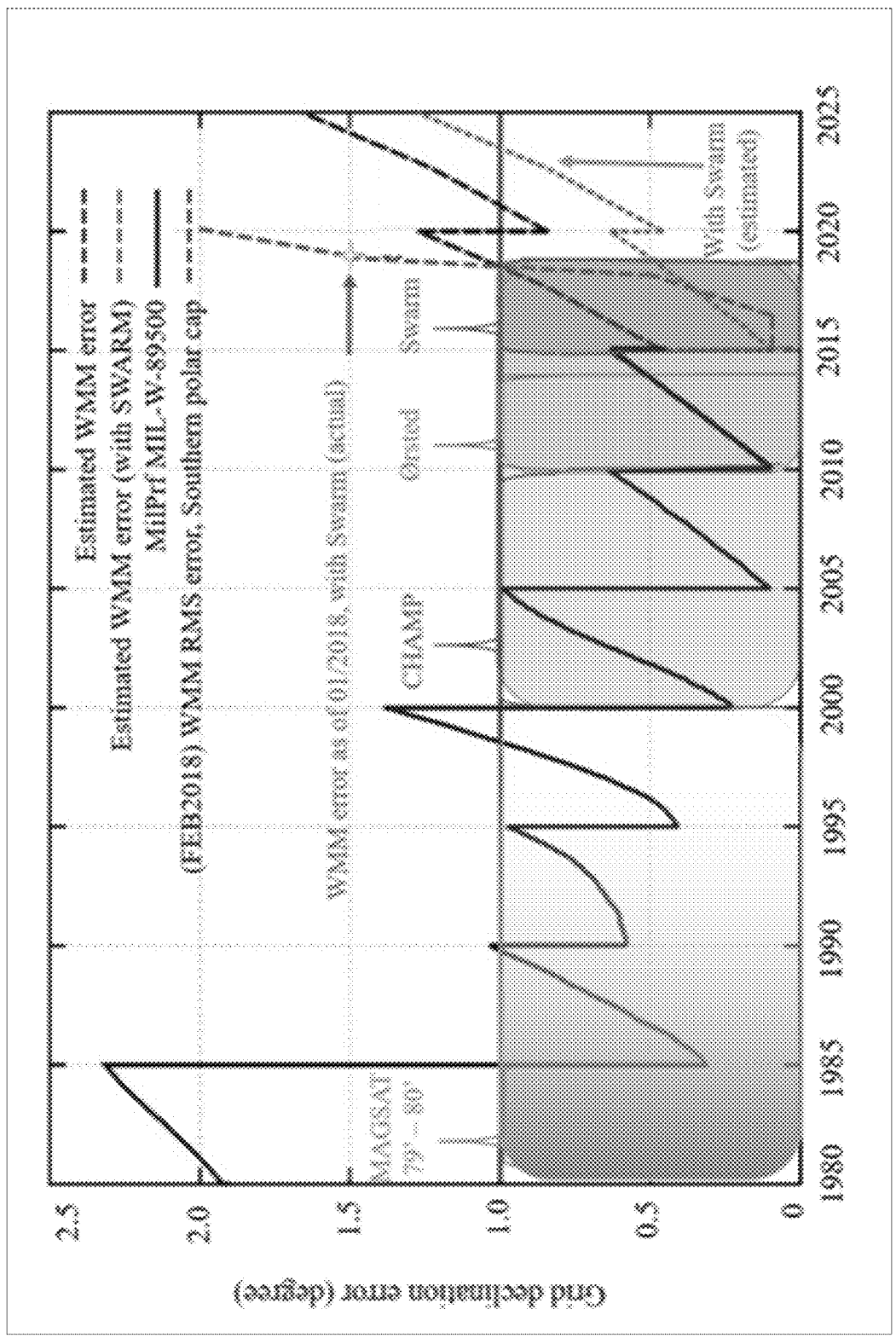
FIG. 4 is a chart of the accuracy of the World Magnetic Model from 1980 to 2015 (actual) and then through 2025 (estimated)

FIG. 4 shows the WMM estimated error over time. The area below the horizontal solid line indicates the 5-year lifetime performance goal of WMM-generated GV error, measured at ≤1.0 degree RMS within the Polar Regions. The solid trace shows actual accuracy, while the dashed traces indicate the anticipated accuracy of VVMM2015 with and without enhancements from the SWARM mission data. The star shows the current exceeded performance specification of 1.5 degree RMS error. The dashed trace to the left of the star is the actual accuracy of VVMM2015 with enhancements from SWARM mission data, while the dashed trace to the right of the star shows the anticipated accuracy of VVMM2015 without out-of-cycle WMM enhancements before 2020.

Despite the addition of the European Space Agency's SWARM mission, a three-satellite constellation launched in 2013, current rates of secular acceleration have continued to make long-term magnetic modeling a challenge. It is therefore necessary, in order to prevent potential runway incursions caused by the current secular acceleration, to adopt alternative methods of comparable accuracy that can also be easily calculated between WMM epochs should future versions continue to exceed accuracy goals. Because airfield construction projects are costly, and because they require adequate planning years in advance to update publications, neighboring facilities, and other systems across the globe, a modified method not constrained to the same rigorous accuracy demands may prove beneficial to the aviation community. When considering that recent changes in the main magnetic field have exceeded GV-error thresholds almost two years before the planned WMM update, and with the prospect that current rates may continue to increase further limiting our ability to accurately forecast those changes over time, it makes sense to adopt an alternative method that is accurate enough to forecast ±6 degree declination changes for most CONUS locations, while maintaining an advanced notification system that compromises neither fiscal budgets nor safety.

The International Geomagnetic Reference Field ("IGRF") for 1900 through 2000 showed that Earth's main magnetic field dipole moment decreased by 6.5% since 1900 and increased by 95% and 74% in strengths for the quadrupole and the octupole, respectively. At that time, the IGRF also identified evidence of enhanced growth for four magnetic anomalies and a westward migration of the magnetic center, the ED, by hundreds of miles.

The current limitations on accurate GV error over time are a direct result of knowledge gaps in the evolution of the geomagnetic main field due to convective flow dynamics. In the past, these knowledge gaps have customarily been supplemented by assuming steady core motions, implying an ambient magnetic field that remains frozen from the core fluid to the surface (the "frozen-flux hypothesis"). In the past, the frozen-flux hypothesis has not been ideologically problematic and continues to be used. This is probably due to real-time observations of historically stable periods of SV over the past few centuries. The frozen-flux hypothesis implies inversion from the core to the surface, thereby accurately describing radial changes observed on the surface; however, this simultaneously precludes diffusivity.

Researchers have proposed that lateral contours just below the core/mantle boundary ("CMB") where the internal magnetic field vanishes, so-called 'null-flux curves,' mark movement boundaries of preserved strength, outer-core fluid 'flux-tubes.' The detection of such movement, referred to as a 'null-flux patch,' implies flux diffusion. In large part, this is what has driven many to adopt constrained models to test the frozen-flux hypothesis. Interestingly, evidence has been found for flux diffusion in the South Atlantic. In 2010, using satellite data from MAGSAT, Ørsted, and CHAMP, researchers modeled fifteen different regions of reversed magnetic flux from 1980 through 2005. Although the results showed no significant changes globally (thus supporting the frozen-flux hypothesis), the modified constrained model also suggests a possible frozen-flux failure within the SAA.

Researchers refer to a location in the SAA as St. Helena, centered at 20 degrees south, 15 degrees west. See Chulliat, A., & Olsen, N, "Observation of magnetic diffusion in the Earth's outer core from Magsat, Ørsted, and CHAMP data," Journal of Geophysical Research, pp. 1-13 (2010), the teachings of which are incorporated herein by reference in their entirety. They identify this location as the most intense non-polar, zonal region (φ between −60 and +60 degrees latitude) of reversed flux. A larger non-zonal region near the South Pole shows about 85% of the absolute value detected. The researchers also identified the second and third largest zonal regions as "North Pacific," centered near 45 degrees north, 170 degrees west, and "Mariana," centered near 20 degrees north, 165 degrees east.

Figure 5A:
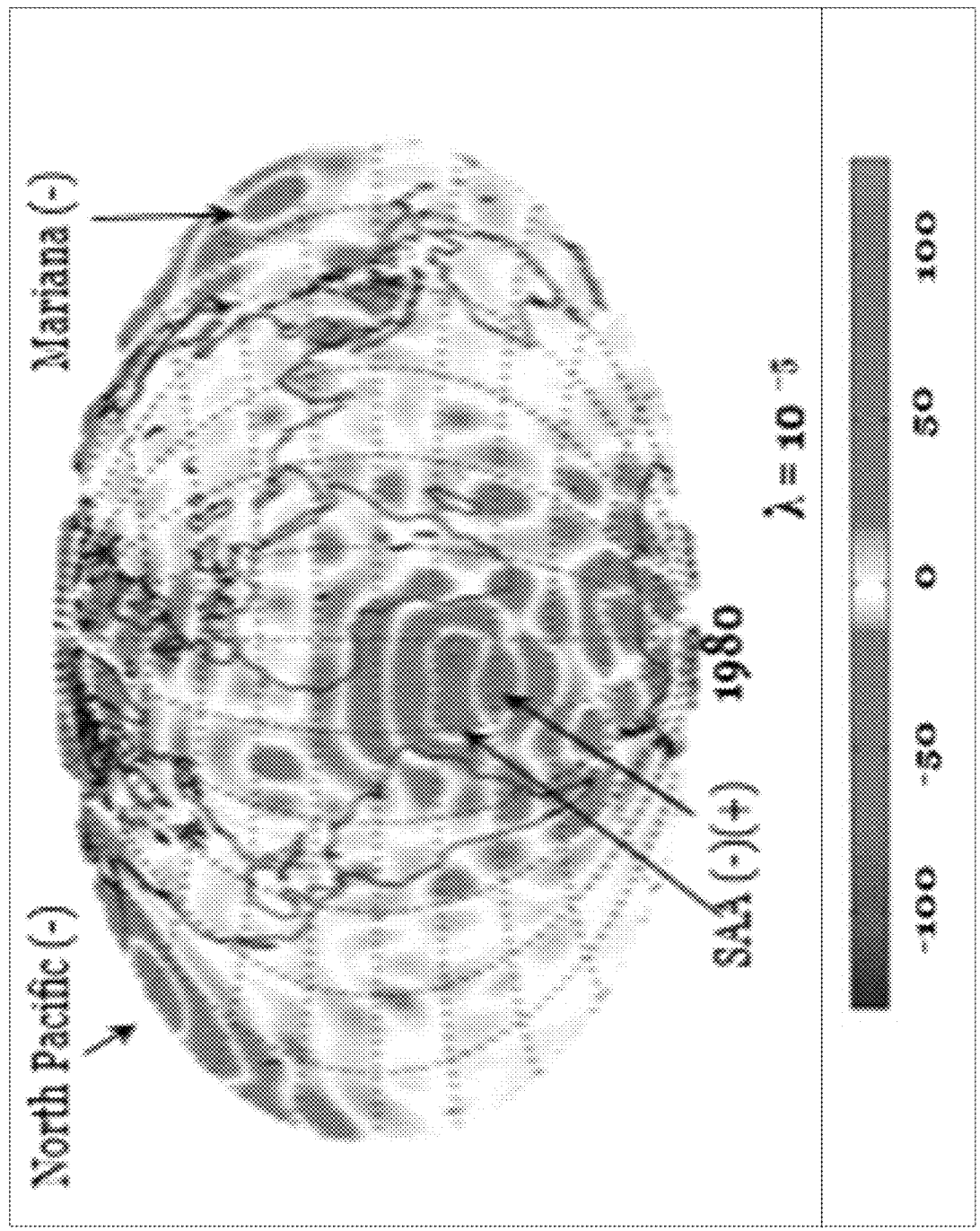
FIGS. 5a, 5b, 5c, and 5d are maps of the changing relationships among the South Atlantic Anomaly, the North Pacific patch, and the Mariana patch.
Figure 5B:
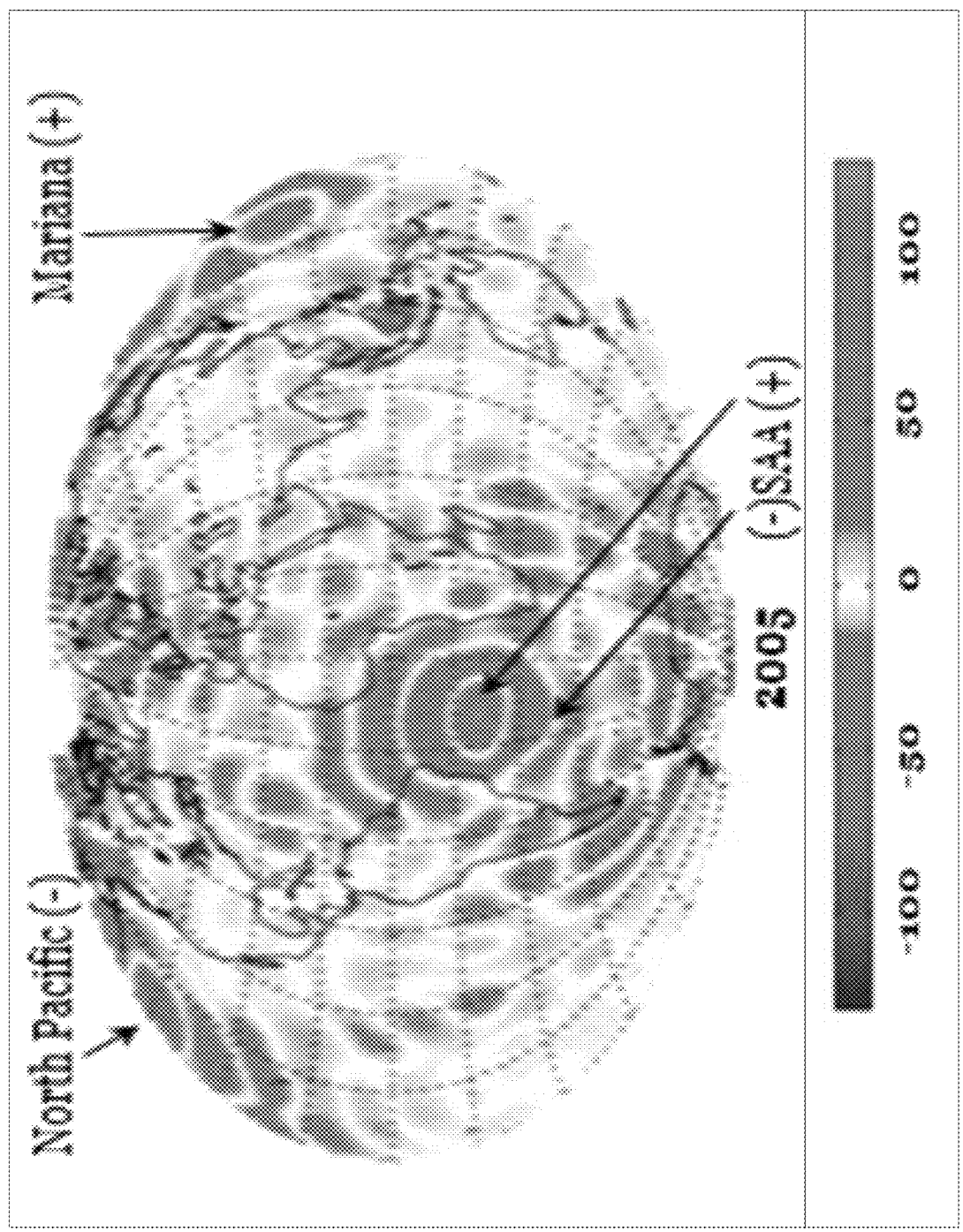
Figure 5C:
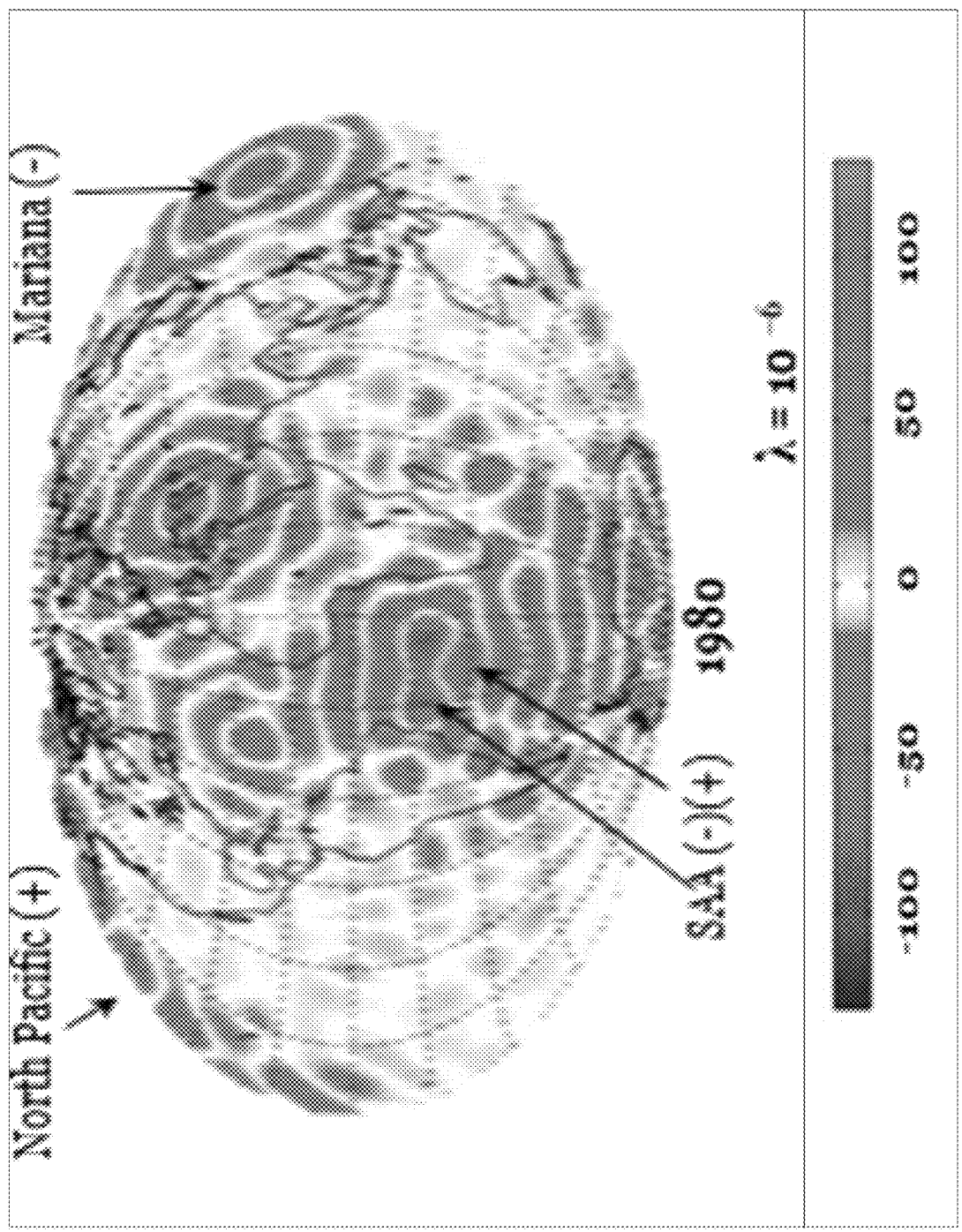
Figure 5D:
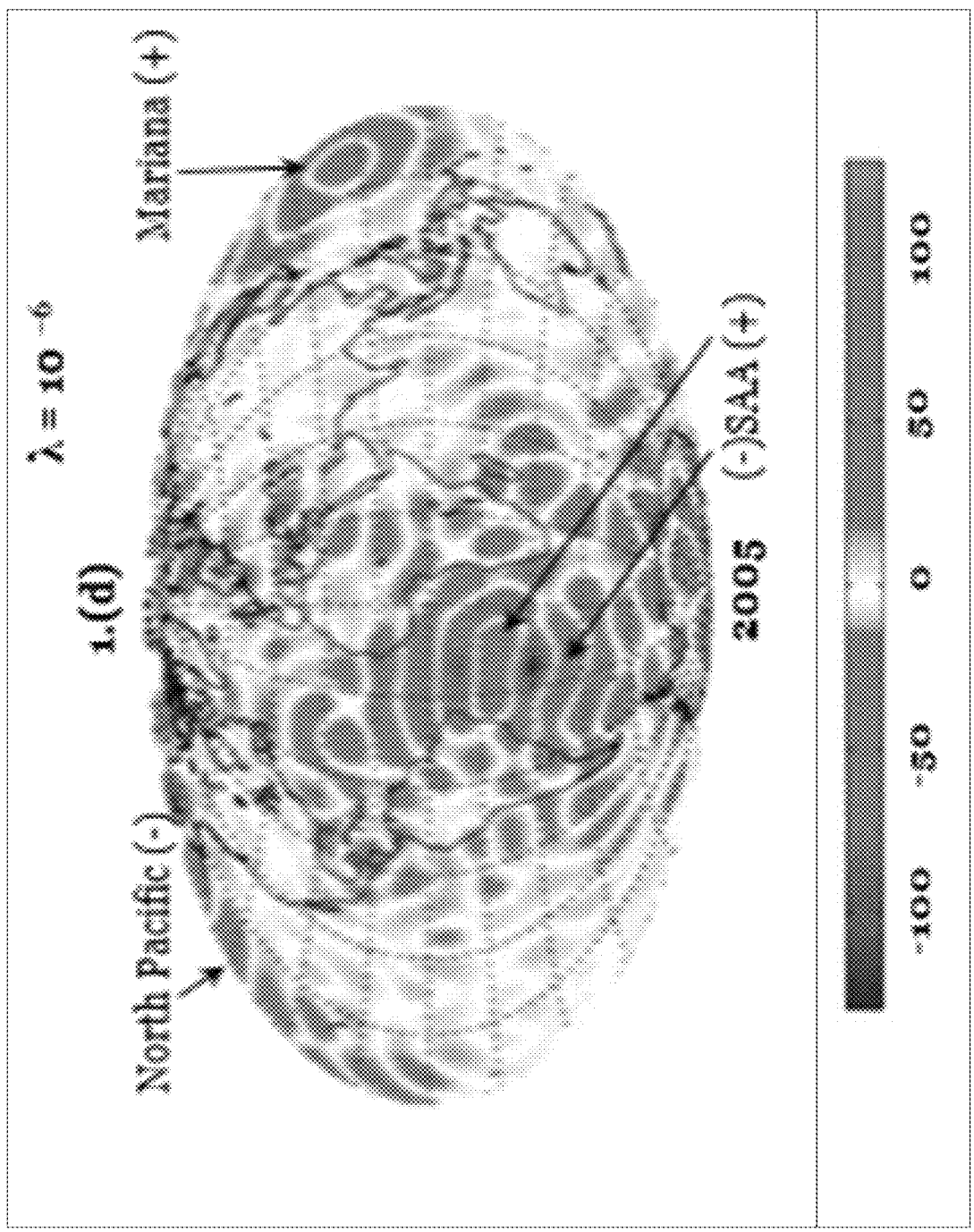

Refer to FIGS. 5a through 5d. FIG. 5a maps the difference between the radial magnetic field at the CMB for $\Lambda=10^{-5}$, $\mu=10^{-16}$, epoch 1980. FIG. 5b is the same as FIG. 5a but for epoch 2005. FIG. 5c is the same as FIG. 5a but with $\Lambda=10^{-6}$, $\mu=10^{-17}$. FIG. 5d is the same as FIG. 5a but for epoch 2005. All magnetic fields are expressed in μT.

In these figures, the terms $\Lambda=10^{-5}$ and $\Lambda=10^{-6}$ describe a regularization parameter. Each epoch was modeled employing the regularization ($\Lambda \neq 0$) and a frozen-flux constraint ($\mu \neq 0$), where $\mu$ denotes a diffusion constraint. The model compares the $\Lambda$-regularization against an unconstrained ($\Lambda \neq 0 \neq \mu$) version from the other epoch with the same $\Lambda$-parameter. This model allows visually constrained short term radial diffusion and allows comparison of flux RMS scalar residuals for each epoch.

Although researchers accurately identify other regions of reversed magnetic flux, they pass over the fact that from 1980 through 2005 there were changes in intensity and polarity between the SAA, the North Pacific patch, and in Mariana patch. Under the $\Lambda=10^{-5}$ regularization for 1980 (FIG. 5a), the reversed flux patch in the SAA directly coincides with the flux patch in the North Pacific, while the Mariana flux patch just becomes visible. In 2005 under the same regularization (FIG. 5b), the polarities for the SAA patch and the North Pacific patch swap positions, with the Mariana flux patch still only slightly visible. Under the $\Lambda=10^{-6}$ regularization parameter during 1980 (FIG. 5c), the North Pacific patch shows a marked decrease in intensity, and the Mariana patch appears to have adopted the flux intensity previously held by the North Pacific patch under the $\Lambda=10^{-6}$ regularization (compare with FIG. 5b). The 2005 $\Lambda=10^{-6}$ regularization (FIG. 5d) again shows the SAA with opposite polarity from the 1980 epoch, and the North Pacific and Mariana patches still appear to swap intensities. Also in FIG. 5d, an area of strong negative polarity in the southern portion of the SAA patch centroid shows evidence of northern migration when compared with FIG. 5c. Together, these images suggest that the consistent dominant zonal intensities within the SAA patch appear to be intrinsically tied to the Mariana patch and to the North Pacific patch and may play a role in regulating the intensity of each. In FIG. 5c, an area north of Turkey, the "Black Sea patch," is neglected for having a non-evident correlation between the two epochs.

The possibility that the SAA reversed-flux patch may somehow regulate other zonal regions of reversed flux is significant in three ways. First, because the orbital parameters of MAGSAT required a "double measurement" (i.e., in the morning and evening), the overall dataset used for 1980 was increased. This implies that under the $\Lambda=10^{-6}$ regularization, the intensity of the North Pacific patch is likely a remnant of scalar residuals hidden within the dataset. This suggests that the $\Lambda=10^{-6}$ regularization likely shows a more accurate version of reversed-flux zonal field intensities between 1980 and 2005. Second, MagNP, GeoMagNP, and the rotation axis all show increased migration rates near the year 2000 which falls between the 1980 and 2005 epochs, where zonal flux polarity reversals were observed. Lastly, the centroids of the SAA patch and the Mariana patch are exactly antipodal, implying the possibility of an unknown axial component that continues to be neglected in geomagnetic modeling.

The WMM relies on accurate, measured locations for the North and South geomagnetic (dipole) poles. These poles can be computed from only the first three Gauss coefficients to calculate the Earth-centered dipole axis. These coefficients are accurate for about 95% of the mean square field at the surface. A more realistic model of Earth's geomagnetic dipole, the ED, is determined by modifying these first three coefficients to offset the ED axis from the Earth-centered dipole axis. Because of this offset, the calculations used to determine the ED are dependent upon map projection, but, when calculated, can improve accuracy of the mean square field at the surface by about another 2 degrees (to about 97%). FIG. 6 shows calculated 5-year increments of the ED axial poles from 1945 through 2015.

Upon comparison, the North ED axial pole lies between the GeoMagNP and the MagNP. All three poles migrate generally to the northwest with a mean azimuth of 323.51 degrees, and around 1975 all three show a slight easterly migration. The latter has been attributed to a geomagnetic jerk near 1970.

Measurements of the migration rates of all three poles suggest that the GeoMagNP and the MagNP share a fundamental, hysteretic relationship with the ED and with the SAA. The GeoMagNP consistently has the slowest migration rate, and the ED moves slightly faster. During the same period, the MagNP migration rates showed the fastest increases, and all three poles began increasing near the year 2000. (See FIGS. 7a, 7b, 7c, and 7d.) This simultaneous change in migration rates implies that the pole furthest from the SAA is the most influenced by changes at the CMB within the SAA. This premise can be easily verified, upon the release date of the forthcoming WMM, by comparing new migration rates with previous rates. A positive correlation would indicate accelerated migration of the ED pole, dominating hysteresis continuing to maintain the Geo-MagNP, and a continued accelerated easterly trek of the MagNP.

Figure 7A:
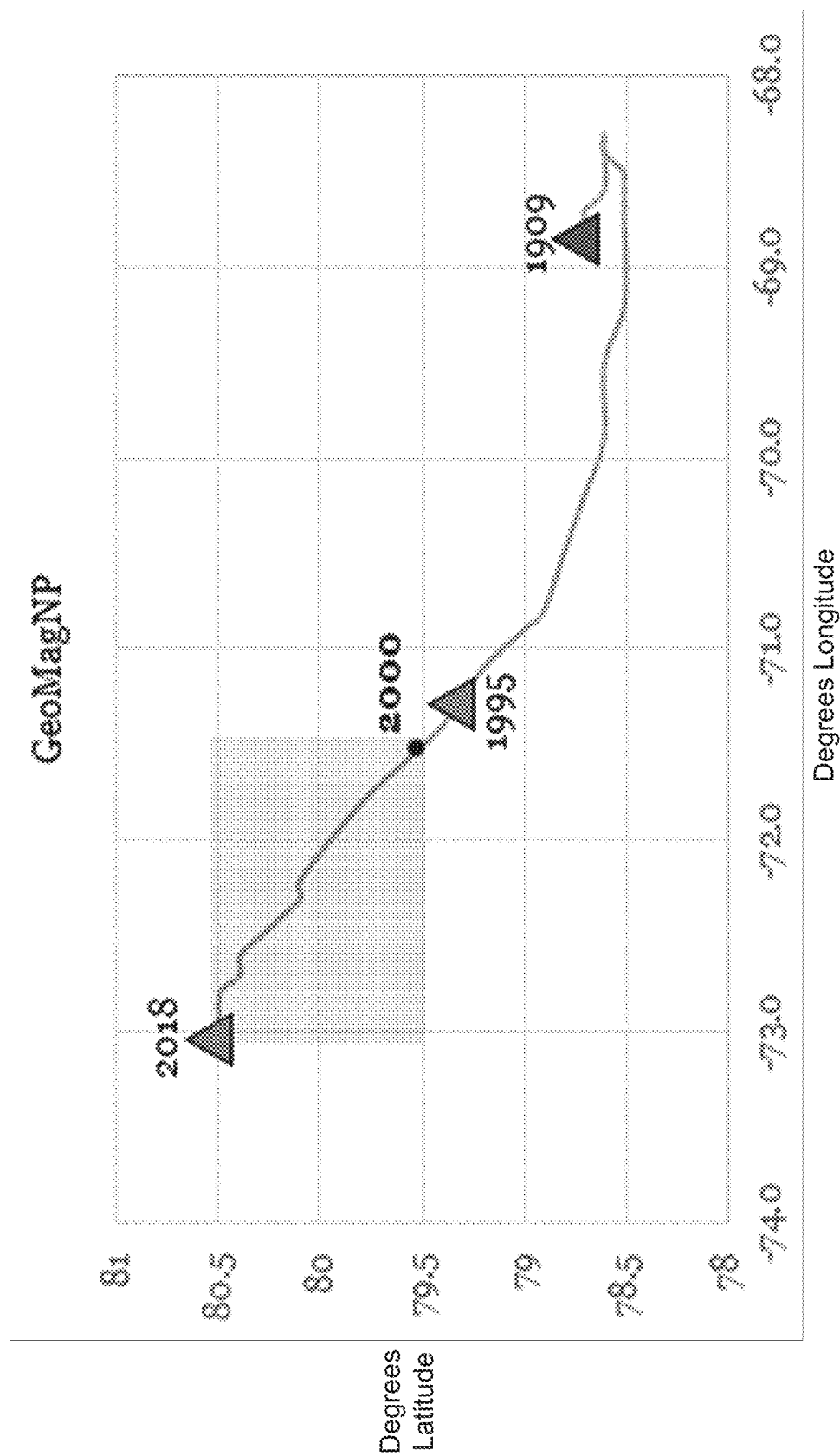
FIGS. 7a, 7b, 7c, and 7d are various depictions of the recent migrations of the geomagnetic dipole and the northern magnetic dipole.
Figure 7B:
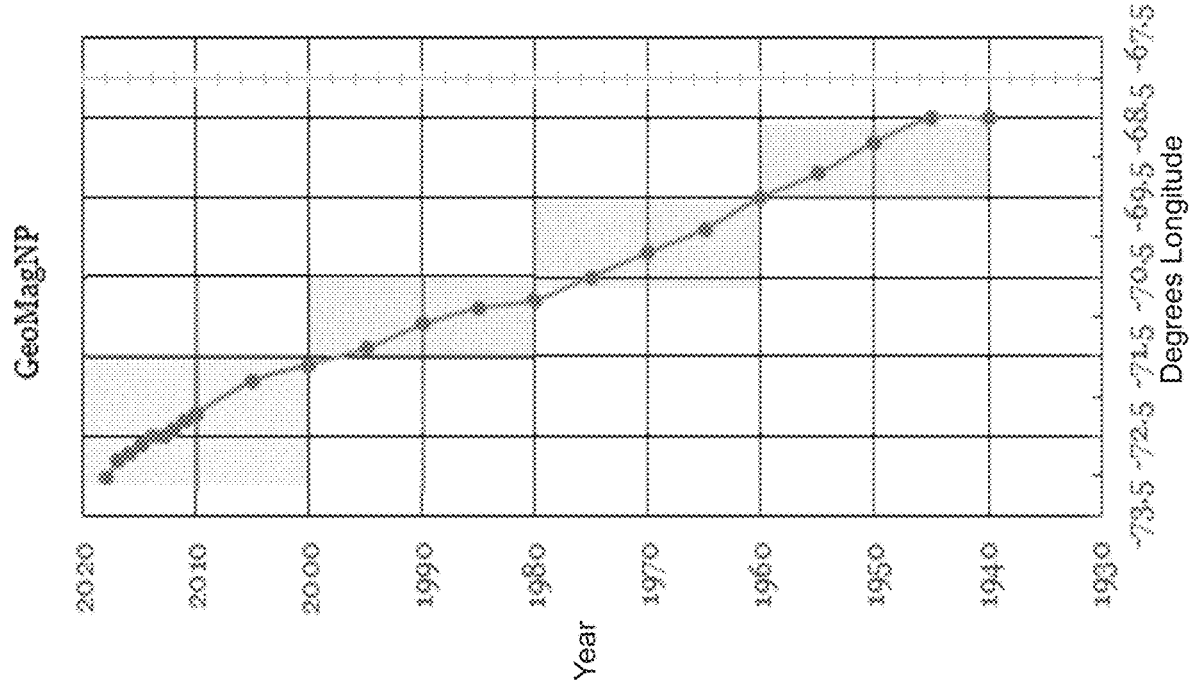
Figure 7C:
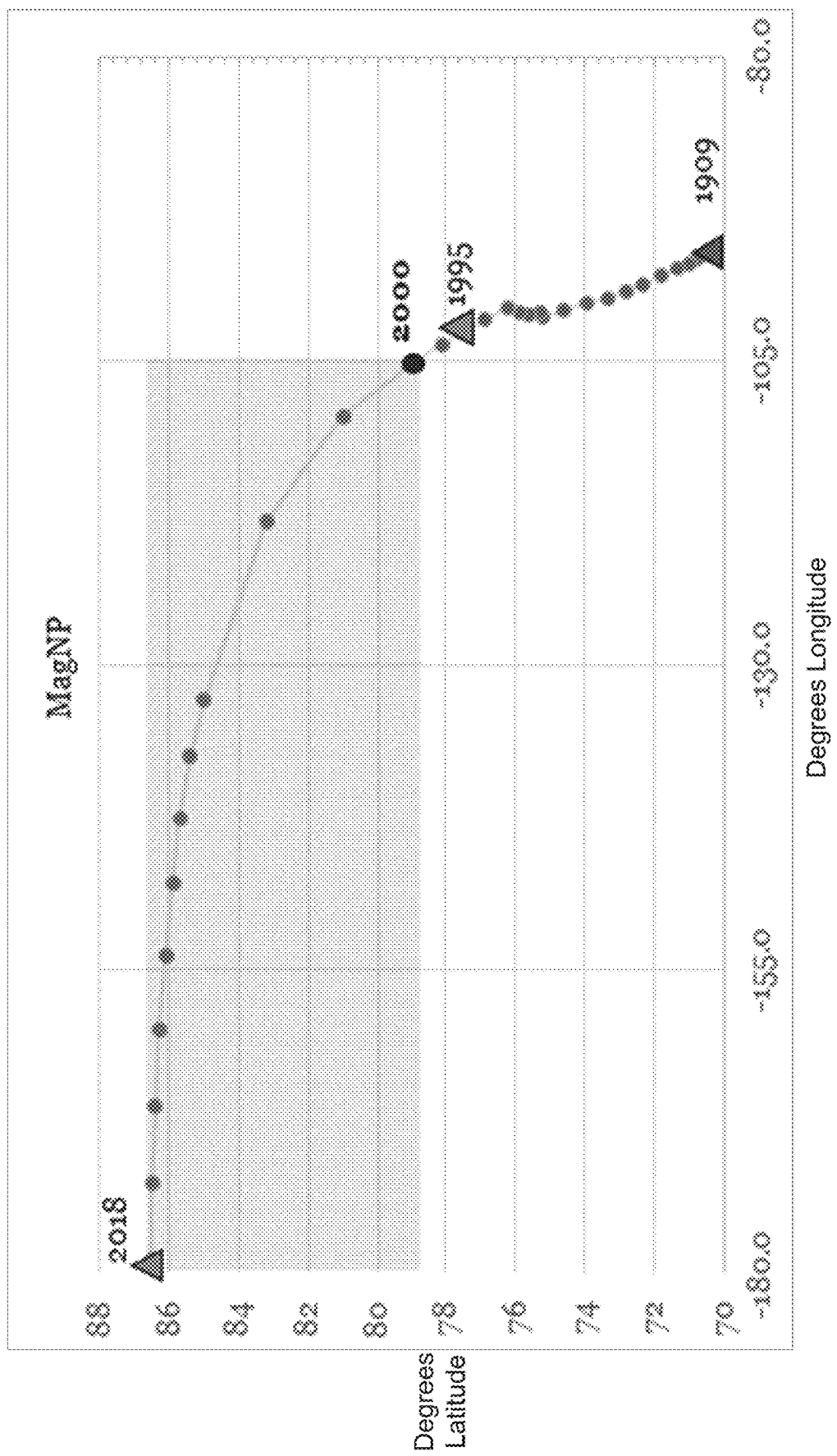
Figure 7D:
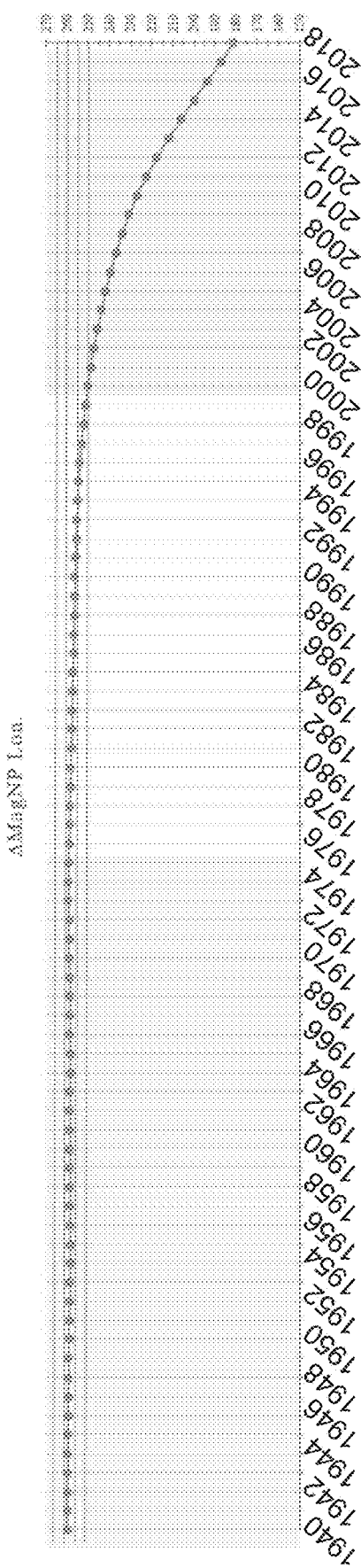

FIGS. 7a and 7b show the migration of the GeoMagNP from 1909 through 2018. FIGS. 7c and 7d shows the migration of the MagNP over the same period. See also the tables in FIGS. 2 and 3.

Figure 8:
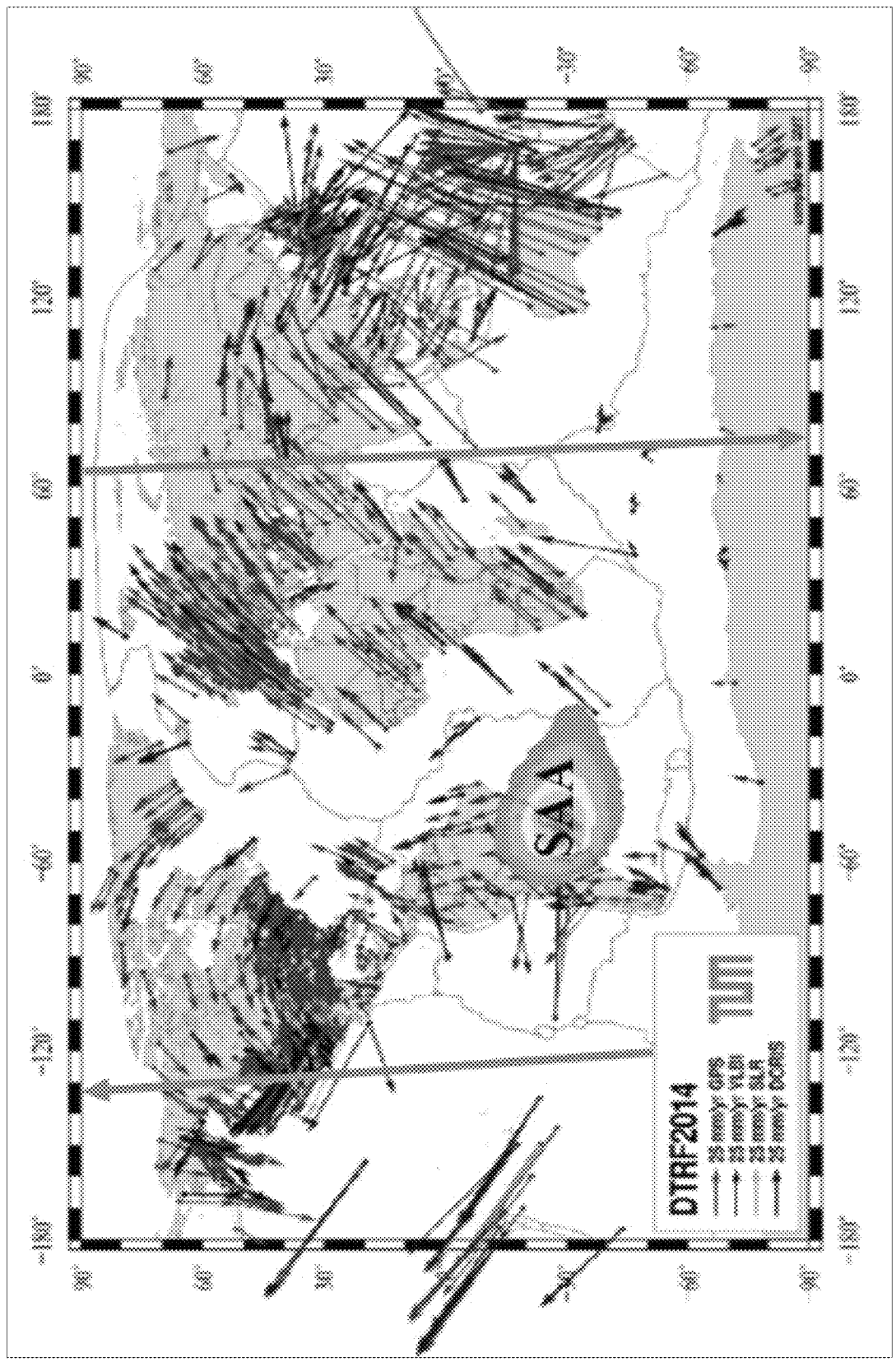
FIG. 8 is a map showing the relationship between the South Atlantic Anomaly and a hypothetical "magnetic vertical equator;"

Assuming that the combined magnetic migration and the evident change in the rotation axis are indicative of a magnetic component of true polar wander, a clockwise, tangentially geostrophic flow would be expected in the reversed-flux patch near the SAA, and an abbreviated counter-clockwise flow would be expected near the Mariana reversed-flux patch. The proposed location of this reversed-flux dipolar rotation implies a magnetic vertical equator that rotates upward between 110 and 117 degrees west and between 63 and 70 degrees east. FIG. 8 shows the location of the SAA patch (marked by its initials) and the hypothetical magnetic vertical equator drawn with arrows indicating directional flow. These locations are superimposed onto the Deutsches Geodätisches Forschungsinstitut realization of the International Terrestrial Reference Frame of 2014 and show the positions and horizontal surface velocities as recorded by globally distributed geodetic plate-boundary observing stations.

Coincidentally, other researchers have found that an accelerated toroidal flow model better explains a large portion of the observed SV over the 2000-2005 period but was less effective at explaining historical SV. This supports the observation that suggests that the SAA reversed-flux patch drove polarity shifts between the North Pacific and Mariana patches sometime between 1980 and 2005 (and likely near the year 2000).

Using this hypothesis as a mechanism to forecast changes to runway declinations requires assuming an extrinsic Euler pole situated in the centered location of the SAA reversed-flux patch located at 20 degrees south, 15 degrees west. Because the horizontal flow is assumed to be clockwise near the SAA, the haversine formula is used to calculate the great-circle distance between the SAA and the ED. Given the central angle of the two points, $$\Theta = d/R, \qquad \text{Equation (2)}$$

where d=distance, and R represents the Earth's mean radius of 6371.0088 km. Then:

$$\text{hav}(\Theta)=\text{hav}(\varphi 2-\varphi 1)+\cos(\varphi 1)\cos(\varphi 2)\text{hav}(\Lambda 2-\Lambda 1), \quad \text{Equation (3)}$$

where $\varphi 1$ and $\varphi 2$ are the latitudes of the two locations, and $\Lambda 1$ and $\Lambda 2$ are their longitudes. The haversine function of the angle $\Theta$ is then applied to the latitude and longitude difference:

$$\text{hav}(\Theta)=\sin^2(\Delta\varphi/2)+\cos(\varphi 1)\cdot\cos(\varphi 2)\cdot\sin^2(\Delta\lambda/2)=2\cdot\text{atan2}(\sqrt{a},\sqrt{(1-a)})$$

$$d=R\cdot\text{hav}(\theta). \quad \text{Equation (4)}$$

From this result, the migration azimuths and distances from each 5-year ED epoch to the next can be calculated similarly. Then by comparing azimuthal direction and increased distance from one epoch to the next, i.e., beginning in 1980 and ending in 2015, and assuming that each epoch consistently shows increasing or decreasing distances from one epoch to the next, the method produces individual percentages of anticipated migration for subsequent epochs based on the previous measurements of the migration rate and azimuthal direction.

Finally, the azimuths from specific runways to the corresponding ED pole locations listed in FIG. 6 are made along with any forecasted ED pole locations. To obtain the estimated rate of magnetic declination for change per year for runway locations, a calculation of the angular azimuthal difference from one epoch to the next is made from each runway locale to the corresponding ED forecast.

As stated above, because the ED represents about 97% of the mean square field at the surface, it is adequate for estimating ±6 degree changes in declination for most CONUS locations, that is, where $\varphi$ is between −55 and +55 degrees latitude.

Figure 9:
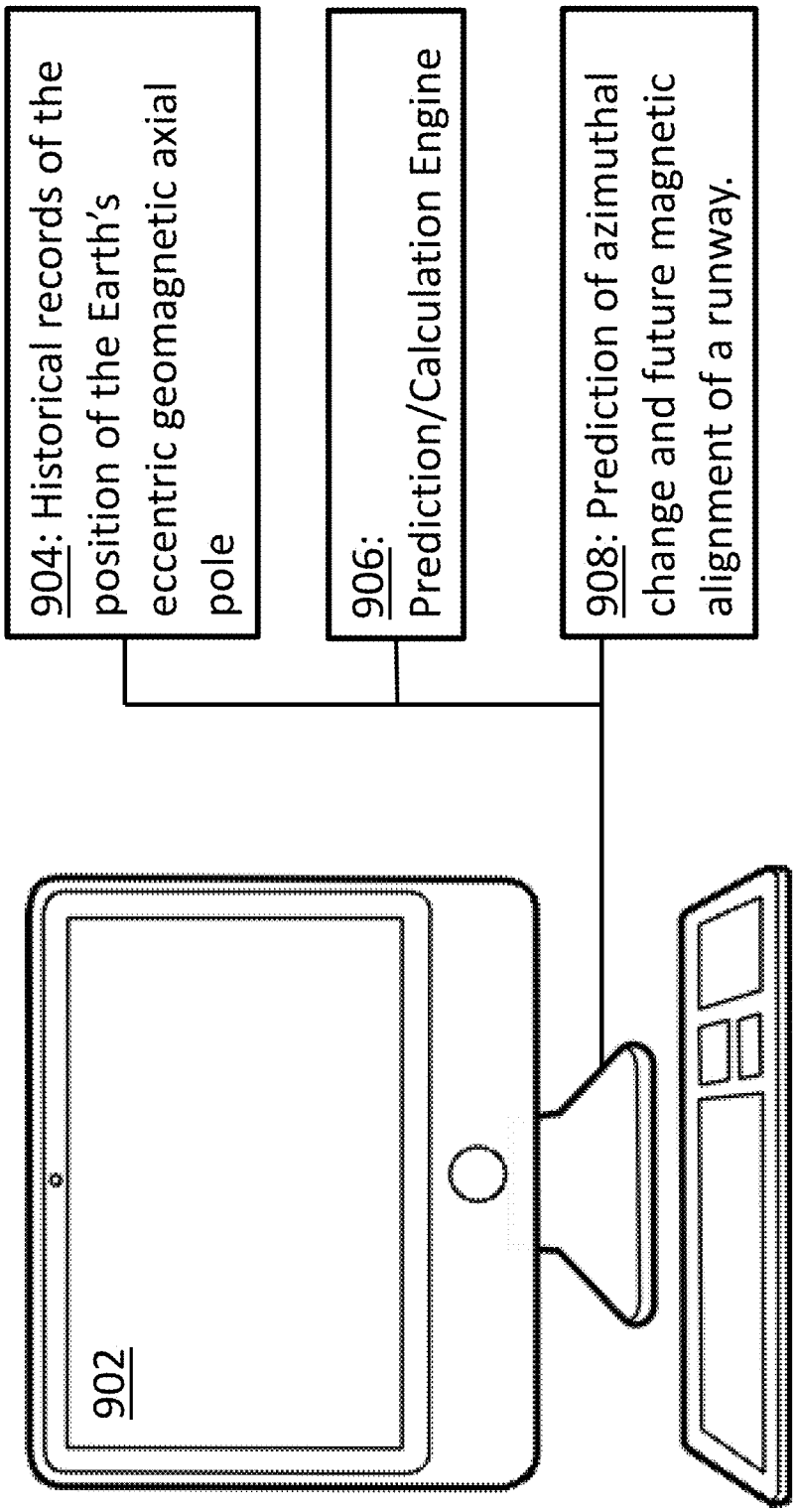
FIG. 9 is a generalized schematic of a representative prediction system in which the present techniques may be practiced.

FIG. 9 is a simplified schematic of a system 900 for implementing this method. A generalized computing system 902 reads historical records 904 showing the measured position of the ED (e.g., as recorded in FIG. 6). From those records 904, a prediction/calculation engine 906 predicts a future trajectory of the ED and the future locations of the ED along that trajectory. From the future locations, the prediction/calculation engine 906 produces a prediction 908 of the future magnetic alignment of a runway. That prediction can include, for example, a date when the runway's actual magnetic alignment will deviate by at least 6 degrees from the runway's PRC MA name.

Figure 10:
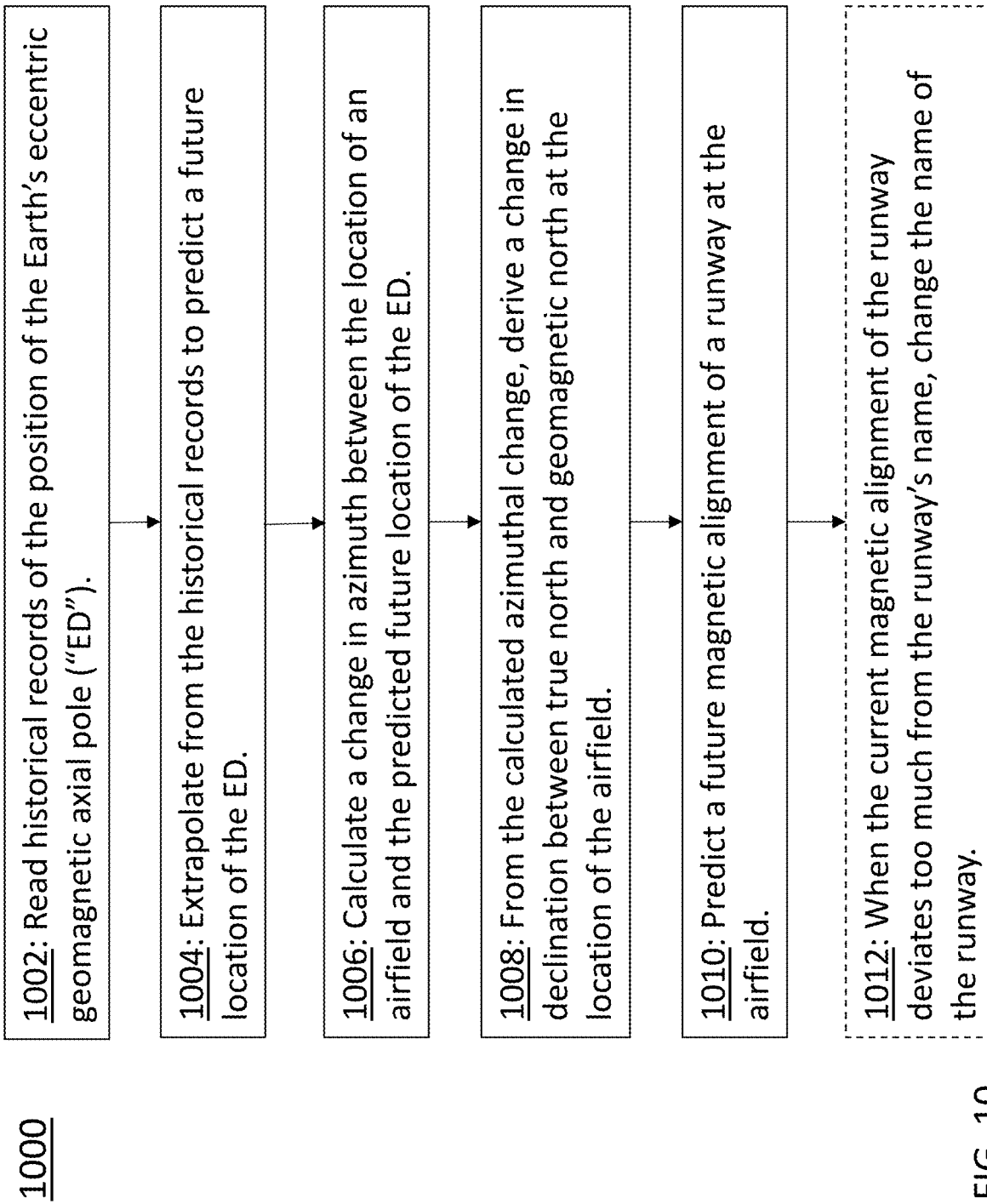
FIG. 10 is a flowchart of a representative method for predicting a future magnetic alignment of a runway.

FIG. 10 is a flowchart of a representative method 1000 for using the above techniques for predicting a future magnetic alignment of a runway. In step 1002, the historical records (see 904 in FIG. 9) are consulted to determine the past trajectory of the ED. Then in step 1004, those records are used, possibly along with other information, to extrapolate the trajectory of the ED into the future. Although the trajectory of the ED has generally been recorded on a per-epoch basis (see, for example, the table in FIG. 6), the extrapolations need not be constrained to such a periodic basis.

As discussed above, the Earth is presently in a stage of increased magnetic instability with regard to its magnetic poles, and the processes that create that instability are not fully understood. It is expected, however, that ongoing scientific research will increase that understanding and will thus provide better tools for making more accurate extrapolations in step 1004.

Then in step 1006, using standard geometric techniques, the change in azimuth between the geographic location of the runway and the predicted future location of the ED is calculated. While the ED's extrapolated trajectory need not be taken at per-epoch periods, it may be, and the change in azimuth may also be calculated on a per-epoch basis. (See, for example, the table in FIG. 12, discussed below.)

In step 1008, the change in azimuth is used to estimate a change in magnetic declination between true north and geomagnetic north at the location of the runway. Because the underlying causality linking the ED to the runway's magnetic declination has not been completely worked out by the scientific community, there is some guess work involved here leading to many possible ways to perform this estimation step 1008. As seen in the example below (FIG. 12), it has been observed that, recently at least, the azimuthal change between the ED and runway on a per-epoch basis historically matches the annual change in magnetic declination of the runway. That observed relation is one that can be used in making the estimation of step 1008.

As can be expected, step 1008 need not produce only one estimate of the magnetic declination of the runway at one chosen future time. Instead, it can be used to plot a trajectory of the runway's future magnetic declination. That predicted trajectory can then be used in a straightforward manner to predict the runway's future magnetic alignment in step 1010.

The predicted future magnetic alignment of the runway produced in step 1010 can inform administrators when the runway's name needs to be changed in step 1012. As discussed above in relation to FIG. 1, current regulations mandate a runway-name change when the runway's existing name deviates by 6 degrees or more from the runway's actual PRC MA. The method 1000 allows administrators to keep up with future changes and to prepare for them in a fiscally sound and safety-oriented manner in the event a WMM prematurely expires before the end of its anticipated 5-year life span.

The first couple of steps of the method of FIG. 10 are applied to the historical records as shown in FIG. 6 to produce the extrapolation data of FIG. 11. This figure shows the ED's migration distance and azimuthal direction calculated for 1945 through 2015 and extrapolated for 2020. The distance from the calculated 2015 ED pole to the extrapolated 2020 ED pole is 54 km at an azimuth of 333.92 degrees. At this direction and velocity, the estimated 2020 location of the 2020 ED pole is 84.519 degrees north, −99.856 degrees west.

As an illustration of the next few steps of the method of FIG. 10, the data in the table of FIG. 11 are applied to Tampa International Airport to produce the results seen in the table of FIG. 12. From left to right, the columns in FIG. 12 are: (1st) the epoch, (2nd) the azimuthal distance in degrees between Tampa International and the ED, (3rd) the change in that azimuthal distance over the course of the epoch, (4th) the annual change in magnetic declination at Tampa International as estimated by the NOAA's National Centers for Environmental Information online Magnetic Field Calculator, and (5th) the difference between the previous two columns. The entries in the table from 1980 through 2015 are historical, while the 2020 entry is estimated using the techniques described above. As can be readily appreciated from the table of FIG. 12, the difference values in the last column are generally quite small, leading to the justifiable assumption that the epochal azimuthal difference (3rd column) serves as a good proxy for the annual change in magnetic declination (4th column).

Note that in the period from 1995 through 2005, the azimuthal difference (3rd column) and the estimated magnetic declination change (4th column) are significantly different. Despite this, the magnetic declination change estimated using the above techniques differs from the NOAA online Magnetic Field Calculator by only 0.15 degree over a 40-year period (1980 through 2020).

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for predicting a future magnetic alignment of a runway, the method based on historical records of a position of the Earth's eccentric geomagnetic axial pole ("ED"), the method comprising:
   extrapolating from the historical records to predict a future location of the ED associated with a future trajectory, expressed in degrees, corresponding to a future azimuth of the ED;
   calculating a difference between a runway trajectory, expressed in degrees, corresponding to a location of an airfield comprising the runway, and the predicted future trajectory, expressed in degrees, of the ED;
   using the calculated difference to derive an estimate of a change in a declination between true north and geomagnetic north at the location of the airfield; and
   based, at least in part, on the estimated declination change, predicting a magnetic alignment of the runway at a future time;
   wherein extrapolating comprises:
   for a plurality of historical records:
   calculating a great-circle distance between the South Atlantic Anomaly and the ED;
   using the calculated great-circle distances to calculate migration azimuthal directions and migration distances of the ED;
   based, at least in part, on the historical calculations, extrapolating to predict a future migration azimuthal direction and a future migration distance for the ED;
   calculating a difference between a current magnetic-alignment-based name of the runway and a predicted future magnetic alignment of the runway;
   comparing the calculated difference against a first set threshold; and
   if the calculated difference is greater than the first set threshold, then changing the magnetic-alignment-based name of the runway by updating at least one of maps, pilot manuals, flight software, and runway signage.

2. The method for predicting a future magnetic alignment of a runway of claim 1:
   wherein extrapolating from the historical records comprises extrapolating on a first period-by-period basis;
   wherein calculating the difference comprises calculating on the first period-by-period basis;
   wherein using the calculated difference comprises using a first period-by-period azimuthal change as an estimate of a second period-by-period change in a declination between true north and geomagnetic north at the location of the airfield; and wherein predicting a future magnetic alignment is based, at least in part, on the estimated second period-by-period declination change.

3. The method for predicting a future magnetic alignment of a runway of claim 2 wherein the first period-by-period basis spans five years and the second period-by-period basis spans one year.

4. The method for predicting a future magnetic alignment of a runway of claim 1 wherein changing the magnetic-alignment-based name of the runway comprises:

based, at least in part, on the estimated second period-by-period declination change and on the first set threshold, predicting a longevity of a proposed changed magnetic-alignment-based name of the runway; and choosing a magnetic-alignment-based name of the runway based, at least in part, on the predicted longevity.

5. A publication comprising the predicted magnetic alignment of the runway at a future time produced by the method of claim 1.

6. A system for predicting a future magnetic alignment of a runway, the system comprising:

historical records of a position of the Earth's eccentric geomagnetic axial pole ("ED"); and a calculating engine configured for:

extrapolating from the historical records to predict a future location of the ED associated with a future trajectory, expressed in degrees, corresponding to a future azimuth of the ED;

calculating a difference between a runway trajectory, expressed in degrees, corresponding to a location of an airfield comprising the runway, and the predicted future trajectory, expressed in degrees, of the ED;

using the calculated difference to derive an estimate of a change in a declination between true north and geomagnetic north at the location of the airfield; and based, at least in part, on the estimated declination change, predicting a magnetic alignment of the runway at a future time;

wherein extrapolating comprises:

for a plurality of historical records:

calculating a great-circle distance between the South Atlantic Anomaly and the ED;

using the calculated great-circle distances to calculate migration azimuthal directions and migration distances of the ED;

based, at least in part, on the historical calculations, extrapolating to predict a future migration azimuthal direction and a future migration distance for the ED;

calculating a difference between a current magnetic-alignment-based name of the runway and a predicted future magnetic alignment of the runway;

comparing the calculated difference against a first set threshold; and if the calculated difference is greater than the first set threshold, then changing the magnetic-alignment-based name of the runway by updating at least one of maps, pilot manuals, flight software, and runway signage.

7. The system for predicting a future magnetic alignment of a runway of claim 6 wherein the calculating engine is further configured for:

extrapolating from the historical records on a first period-by-period basis;

calculating a change in an azimuth on the first period-by-period basis;

using the calculated first period-by-period azimuthal change as an estimate of a second period-by-period change in a declination between true north and geomagnetic north at the location of the airfield; and predicting a future magnetic alignment based, at least in part, on the estimated second period-by-period declination change.

8. The system for predicting a future magnetic alignment of a runway of claim 7 wherein the first period-by-period basis spans five years and the second period-by-period basis spans one year.

9. The system for predicting a future magnetic alignment of a runway of claim 6 wherein changing the magnetic-alignment-based name of the runway comprises:

based, at least in part, on the estimated second period-by-period declination change and on the first set threshold, predicting a longevity of a proposed changed magnetic-alignment-based name of the runway; and choosing a magnetic-alignment-based name of the runway based, at least in part, on the predicted longevity.

10. A publication comprising the predicted magnetic alignment of the runway at a future time produced by the system of claim 6.

* * * * *